(12) United States Patent
Haidacher et al.

(10) Patent No.: US 10,945,579 B2
(45) Date of Patent: Mar. 16, 2021

(54) CONTROL OF A DISHWASHER

(71) Applicant: BSH Hausgeräte GmbH, Munich (DE)

(72) Inventors: Florian Haidacher, Neubeuern (DE); Claudia Häpp, Vaterstetten (DE); Matthias Heckes, Munich (DE)

(73) Assignee: BSH Hausgeräte GmbH, Munich (DE)

( * ) Notice: Subject to any disclaimer, the term of this patent is extended or adjusted under 35 U.S.C. 154(b) by 196 days.

(21) Appl. No.: 16/317,044

(22) PCT Filed: Jun. 29, 2017

(86) PCT No.: PCT/EP2017/066137
§ 371 (c)(1),
(2) Date: Jan. 11, 2019

(87) PCT Pub. No.: WO2018/015124
PCT Pub. Date: Jan. 25, 2018

(65) Prior Publication Data
US 2019/0298143 A1 Oct. 3, 2019

(30) Foreign Application Priority Data

Jul. 19, 2016 (DE) .......................... 102016213171.0

(51) Int. Cl.
*A47L 15/00* (2006.01)
*G05B 13/02* (2006.01)

(52) U.S. Cl.
CPC ....... *A47L 15/0063* (2013.01); *A47L 15/0026* (2013.01); *A47L 15/0028* (2013.01); *A47L 15/0034* (2013.01); *G05B 13/021* (2013.01); *A47L 2301/04* (2013.01);
(Continued)

(58) Field of Classification Search
CPC ............. A47L 15/0026; A47L 15/0028; A47L 15/0034; A47L 15/0063; A47L 2301/04; A47L 2301/08; A47L 2501/26; A47L 2501/30
See application file for complete search history.

(56) References Cited

U.S. PATENT DOCUMENTS

| 5,297,307 A * | 3/1994 | Baek ...................... D06F 33/00 |
| | | 8/159 |
| 5,611,867 A * | 3/1997 | Cooper ................... D06F 34/22 |
| | | 134/18 |
| 2001/0049846 A1 | 12/2001 | Guzzi et al. |

(Continued)

FOREIGN PATENT DOCUMENTS

| DE | 102008042290 A1 | 3/2010 |
| EP | 2913906 A1 | 9/2015 |

OTHER PUBLICATIONS

International Search Report PCT/EP2017/066137 dated Sep. 29, 2017.

*Primary Examiner* — Jennifer L Norton
(74) *Attorney, Agent, or Firm* — Michael E. Tschupp; Andre Pallapies; Brandon G. Braun

(57) ABSTRACT

In a method for controlling a dishwasher, a user preference is captured for a cleaning cycle of the dishwasher. Parameters associated with a cleaning cycle of the dishwasher are read over a plurality of cleaning cycles, and a user input that indicates satisfaction by the user with one of the cleaning cycles is captured. An optimization is determined of a parameter of the parameters on the basis of the user input and the user preference.

17 Claims, 6 Drawing Sheets

(52) U.S. Cl.
CPC ....... *A47L 2301/08* (2013.01); *A47L 2501/26* (2013.01); *A47L 2501/30* (2013.01); *G05B 2219/2613* (2013.01)

(56) References Cited

U.S. PATENT DOCUMENTS

| | | | |
|---|---|---|---|
| 2004/0107510 A1* | 6/2004 | Buckroyd | D06F 34/28 8/159 |
| 2005/0126603 A1* | 6/2005 | Rosenbauer | A47L 15/4229 134/25.2 |
| 2008/0065244 A1* | 3/2008 | Woerdehoff | D06F 34/28 700/83 |
| 2011/0209729 A1 | 9/2011 | Beaudet et al. | |
| 2016/0312396 A1* | 10/2016 | Cruickshank | D06F 33/00 |
| 2017/0139379 A1* | 5/2017 | Scheckelhoff | H04L 12/2825 |
| 2017/0354305 A1* | 12/2017 | Beaudet | A47L 15/0021 |
| 2018/0066389 A1* | 3/2018 | Wu | G05B 19/048 |

* cited by examiner

CONTROL OF A DISHWASHER

The invention relates to controlling a dishwasher. In particular, the invention relates to adapting interactively a sequence controller of a dishwasher to requirements of a user.

CROSS-REFERENCES TO RELATED APPLICATIONS

This application is the U.S. National Stage of International Application No. PCT/EP2017/0669137, filed Jun. 29, 2017, which designated the United States and has been published as International Publication No. WO 2018/015124 A1 and which claims the priority of German Patent Application, Serial No. 10 2016 213 171.0, filed Jul. 19, 2016, pursuant to 35 U.S.C. 119(a)-(d).

BACKGROUND OF THE INVENTION

A dishwasher can treat dishware according to different programs in order to clean it. The programs can be adapted to different load amounts or different types of dishware, for instance pans, plates or glasses, and may differ, for example, in terms of a cycle length or an amount of added detergent. Some dishwashers allow selection of an option for a program. An option may include, for example, a faster cycle or a particular pretreatment of the dishware to be cleaned.

US 2011/0209729 A1 relates to a technique for dynamic adjustment of a cleaning program for a dishwasher based on an assessment of the cleaning result by a user.

Not all the facilities offered by a dishwasher can be utilized by a known interactive program adjustment. It is not currently possible to find adapting the program controller to habits or wishes of a user.

An object of the invention is to allow better interactive adaptation of a sequence controller of a dishwasher.

BRIEF SUMMARY OF THE INVENTION

This object is achieved according to the invention by the subject matter of the independent claims. The dependent claims give embodiments of the invention.

A method according to the invention for controlling a dishwasher comprises the steps of capturing a user preference for a cleaning cycle of the dishwasher; reading, over a plurality of cleaning cycles, parameters associated with a cleaning cycle of the dishwasher; capturing a user input that indicates the satisfaction thereof with one of the cleaning cycles; and determining an optimization of a parameter of the parameters on the basis of the user input and the user preference.

The general user preference can include a boundary condition or the result of a cleaning cycle. For example, the result may relate to clean dishware, low environmental impact, low energy costs, low wear, gentle treatment, or short duration of the cleaning cycle. The boundary condition may relate to, for example, a preferred operating time (for instance overnight or on weekday mornings), a preferred fill level (for instance more than a preset threshold value) or quiet running.

The user preferences may indicate incompatible changes to a parameter. For instance, a first user preference for a short cycle time may be achieved by a high water temperature, but a second user preference for low energy costs may require a low water temperature, however. This apparent contradiction can be resolved by capturing the satisfaction of the user with a cleaning cycle. Hence it can be determined, for example, which of the preferences is more important to the user, or a parameter setting can be found that reconciles the two preferences, for instance in the example above operating at low water temperature with greater addition of detergent or at higher water pressure.

This procedure allows the cleaning cycle to be better adapted to the specific preferences and the assessment of the user. Parameters for the cleaning cycle can form a program for the cleaning cycle, which program is adapted to the user. It is particularly preferred that the parameter is optimized such that better use is made of the capabilities of the dishwasher. For example, opportunities offered by a load sensor, zeolite drying or a sensor for organic compounds may not be fully exploited by optimizing to a result of the cleaning cycle in a known manner. By virtue of the interactive optimization, these technologies can be integrated in the optimization process. In addition, the above-mentioned boundary conditions can be incorporated in the optimization, allowing the cleaning cycle to be better adjusted to the user.

The user is preferably provided with advice to adapt a parameter on the basis of the specific optimization. In other words, a recommendation can be output to the user for the user himself to alter a specific parameter manually. It has been found that monitoring and subsequent statistical analysis of the user behavior in operating a dishwasher is not enough to shift the user into behaving differently. By providing a specific proposal, the user can be better placed to decide whether or not he would like to perform a particular optimization. In another embodiment, the parameter can be optimized automatically. Better optimization in particular of a parameter that cannot be changed directly by the user or is preferably changed in combination with other parameters is thereby possible.

In another embodiment, the user input is referred to a predetermined sub-aspect of the cleaning cycle. This can be done by outputting a prompt to input an indication of satisfaction of the user with the predetermined sub-aspect of the cleaning cycle, and optimizing the parameter on the basis of the user input with regard to the sub-aspect. Different sub-aspects can be optimized successively or simultaneously. It is particularly preferred that first, parameters that ensure the satisfaction of the user are found as quickly as possible. Subsequently, an attempt can be made to increase the satisfaction further by optimizing the sub-aspects. For example, one sub-aspect may relate to the cleaning, another to the drying, and a third to the shine on glass and cutlery. Yet another sub-aspect may relate to a boundary condition of the cleaning cycle. If a parameter relates to a plurality of sub-aspects, these can also be optimized jointly or in a predetermined sequence.

It is also preferred that the prompt is defined according to the user preference. A user preference may be abstract and may possibly relate to a plurality of parameters. The prompt can be given in such a way that the user preference is questioned more closely or analyzed more precisely. For instance, a user preference for thorough cleaning may be broken down into cleaning of cutlery, pans and plates or into the reliable removal of particular soiling. It is thereby possible to conduct a better user consultation without overwhelming the user with a large number of detailed questions.

It is also preferred that the prompt is given according to parameters that have already been optimized. This can ensure that the optimization of a parameter has not caused dissatisfaction relating to another sub-aspect. If a new dissatisfaction exists, then further optimization can be performed.

The parameter can be changed successively over a plurality of cleaning cycles until a user input indicates sufficient optimization of the sub-aspect. Often different parameters can be optimized to increase satisfaction with a sub-aspect. In general, every benefit brought about by changing a parameter is also associated with a drawback. It is therefore desirable to optimize a parameter just as far as is possible to ensure user satisfaction. It is hence possible to minimize a drawback, for instance high energy usage or a long cleaning time.

In a particularly preferred embodiment, at least two parameters that affect the sub-aspect are determined. Each parameter is here associated with a cost figure or a cost function. Often the parameter that has high costs is also associated with high efficacy, and vice versa. Preferably, the parameter having the lower cost figure is changed first. If a sufficient optimization can be achieved in this process, the parameter having the higher cost figure is not changed. Only when a change to the first parameter is not enough for sufficient optimization can changes be made to the second parameter, which has the higher cost figure.

It is thereby possible to provide escalation over two or more parameters, which ensures that the satisfaction of the user with a predetermined sub-aspect is achieved with minimum possible costs. The costs can be regarded as a drawback and may include, for example, environmental impact, length of cleaning time or energy usage. In one embodiment, different costs or drawbacks are summarized in a points system, so that different drawbacks can be compared with one another in a predetermined manner.

It is also preferred that the two or more parameters are optimized with minimization of the sum of the cost figures once the user input indicates for the first time that the sub-aspect has been sufficiently optimized. The costs for achieving user satisfaction with a sub-aspect can hence be lowered in an improved manner.

A computer program product comprises program code means for performing the above-described method when the computer program product is executed on an execution device or is saved on a computer-readable data storage medium.

An apparatus for controlling a dishwasher comprises a first input device for capturing a user preference for a cleaning cycle of the dishwasher; an interface for reading, over a plurality of cleaning cycles, parameters associated with a cleaning cycle of the dishwasher; a second input device for capturing a user input that indicates the satisfaction thereof with one of the cleaning cycles; and a processing device for determining an optimization of a parameter of the parameters on the basis of the user input and the user preference.

The two input devices can also coincide. In a preferred embodiment, a mobile device, which is wirelessly coupled to the dishwasher and can be used as an input and output device, is employed for user interaction with the dishwasher. The processing device can be configured to control the dishwasher or be equipped with an interface to another device that performs the control of the dishwasher. The processing device is preferably configured to perform the method described above. Said processing device is usually built into the dishwasher. In another embodiment, some of the processing can also be performed by another processing device, with which contact can be made in particular wirelessly. This processing device can be integrated in the above-mentioned mobile device or can be accessed via a data network. In particular, a server, with which contact can be made via the Internet, for example, can perform some of the processing. In addition to, or as an alternative to, outsourcing processing capacity, it is also possible to outsource memory capacity in a similar way. In particular, it is thereby possible to store historic data about past cleaning cycles of the dishwasher in detail and to improve analysis of said data.

The features disclosed in relation to the method can be applied analogously to the computer program product according to the invention and to the apparatus according to the invention.

BRIEF DESCRIPTION OF THE DRAWINGS

Embodiments of the invention are now described in greater detail with reference to the accompanying figures, in which.

DETAILED DESCRIPTION OF EXEMPLARY EMBODIMENTS OF THE PRESENT INVENTION

Figure 1:
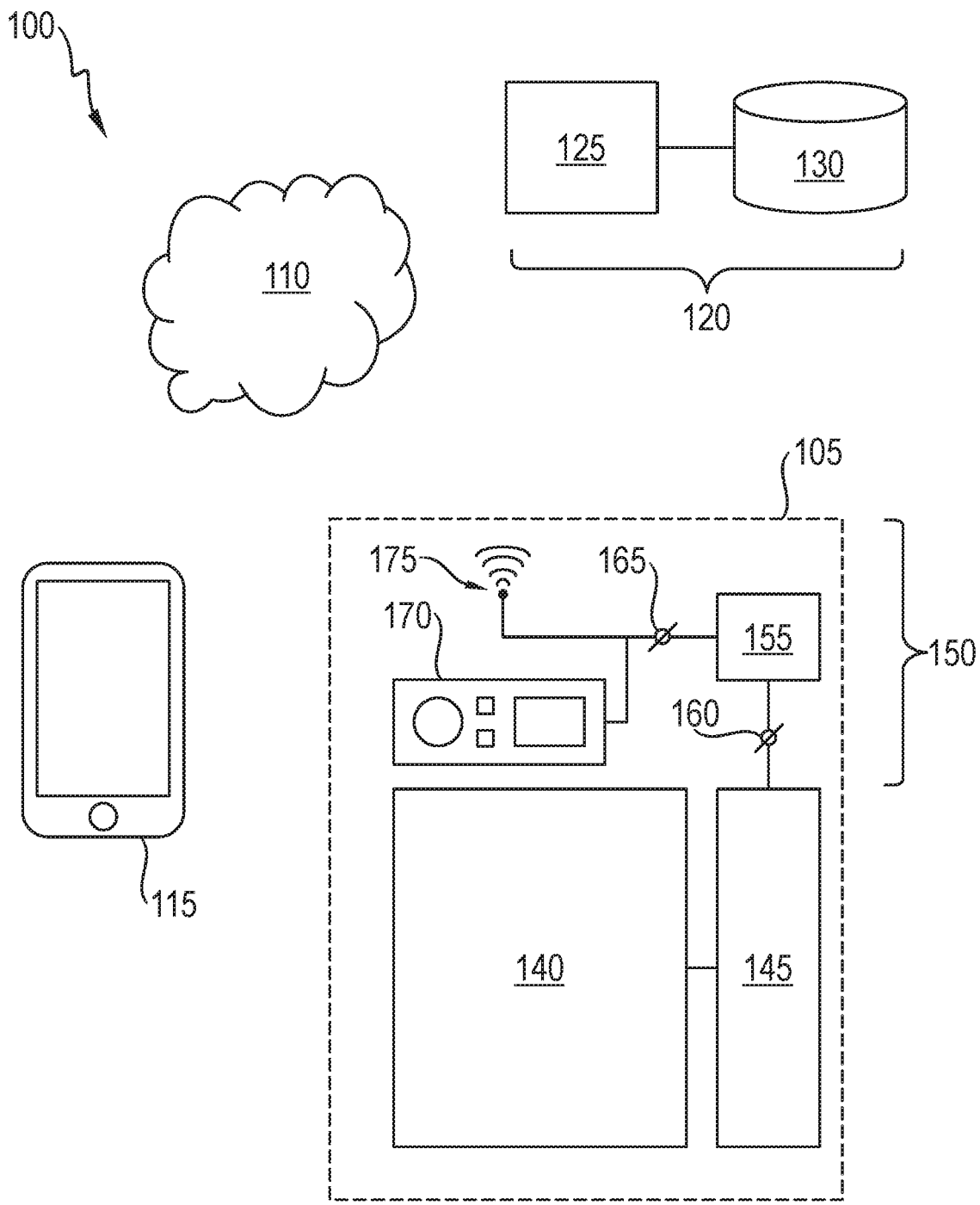
FIG. 1 shows a system comprising a dishwasher.

FIG. 1 shows a system 100 and a dishwasher 105. In addition, the system 100 comprises an optional data network 110, an optional mobile device 115 and an optional server 120, which comprises a processing device 125 and/or a memory 130. The dishwasher 105, the mobile device 115 and the server 120 can be connected to one another via the data network 110. Said data network 110 may be a wired, wireless or mixed data network. In one embodiment, the data network 110 comprises the Internet or a cellular network.

The dishwasher 105 comprises a cleaning chamber 140 for accommodating dishware, a sequence controller 145 in order to treat the dishware in the cleaning chamber 140, and an apparatus 150 for controlling a cleaning process of the dishware. The sequence controller 145 can comprise a control device, a sensor or an actuator, and is preferably configured to control the cleaning process itself, so for instance supplying or pumping out water, adding detergent or activating heating or a circulating pump.

The apparatus 150 comprises a processing device 155, which is connected to the sequence controller 145 by means of a first interface 160, and preferably comprises a second interface 165, which in a first embodiment is connected to an input device 170 mounted on the dishwasher 105, or, in a second embodiment, is connected to a wireless interface 175. These two embodiments can also be combined with each other. The input device 170 is preferably configured for inputs by a user, and in addition can also preferably be used as an output device in order to enter into a two-way interaction with the user. Using the wireless interface 175, the mobile device 115 can be employed for one-way or two-way interaction with the user. In one embodiment, the device 150 has an integrated design with the sequence controller 145.

The sequence controller 145 can be controlled in different ways in order to treat the dishware in the cleaning chamber 140. For example, actuators of the sequence controller 145 can be used to control a water pressure, an amount of water, a water temperature, how much and when detergent or rinse aid is added, and for numerous other possible ways of acting on the dishware in the cleaning chamber 140. A cleaning cycle is considered here to be a sequence of actions by means of the sequence controller 145 on the dishware in the cleaning chamber 140. The sequence can be fixed or can be controlled by values read from the sensors of the sequence controller 145. In addition, the sequence can be controlled by one or more parameters. A parameter may define a threshold value, for instance, which a sensor value must exceed in order to trigger a further action of the sequence controller 145.

It is proposed to design the apparatus 150 such that one or more of the parameters are optimized in the course of a plurality of cleaning cycles of the dishwasher 105. To achieve this, the intention is that one or more user preferences relating to the cleaning cycle are defined by means of the input device 170 or the mobile device 115. The intention is also to use the input device 170 or the mobile device 115 to poll a satisfaction of the user with a cleaning cycle. One or more parameters is then optimized on the basis of the user inputs and optionally further additional information. A time, a date, a day of the week, an earlier selection of parameters, options or rinsing programs for a cleaning cycle, and a value from one of the sensors of the sequence controller 145 can be used, for example, for this additional information.

Figure 2:
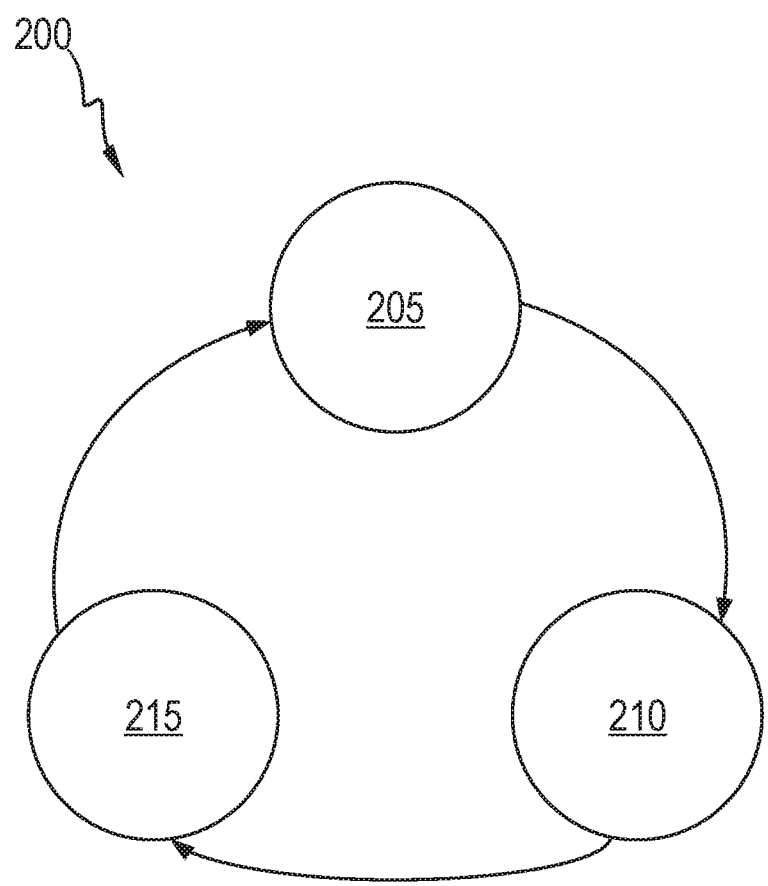
FIG. 2 is a flow diagram of a method.

FIG. 2 shows a flow diagram of a method 200 for controlling the dishwasher 105 of FIG. 1. In a first step 205, an input by the user is made. In a subsequent step 210, the input by the user is used as an assistance to the user in controlling a cleaning cycle of the dishwasher 105. For instance this can be done by selecting or optimizing a program, starting a program with a time delay, or event-controlled stopping of a program. In a further step 215, feedback is made to the user in order to explain more precisely the assistance in step 210. The user can thereby better understand an optimization or selection made and subsequently assess said optimization or selection in step 205. The steps 205 to 215 shown are preferably cycled through repeatedly in an endless loop in order to implement constant interaction with the aim of optimizing the cleaning cycle of the dishwasher 105.

Figure 3:
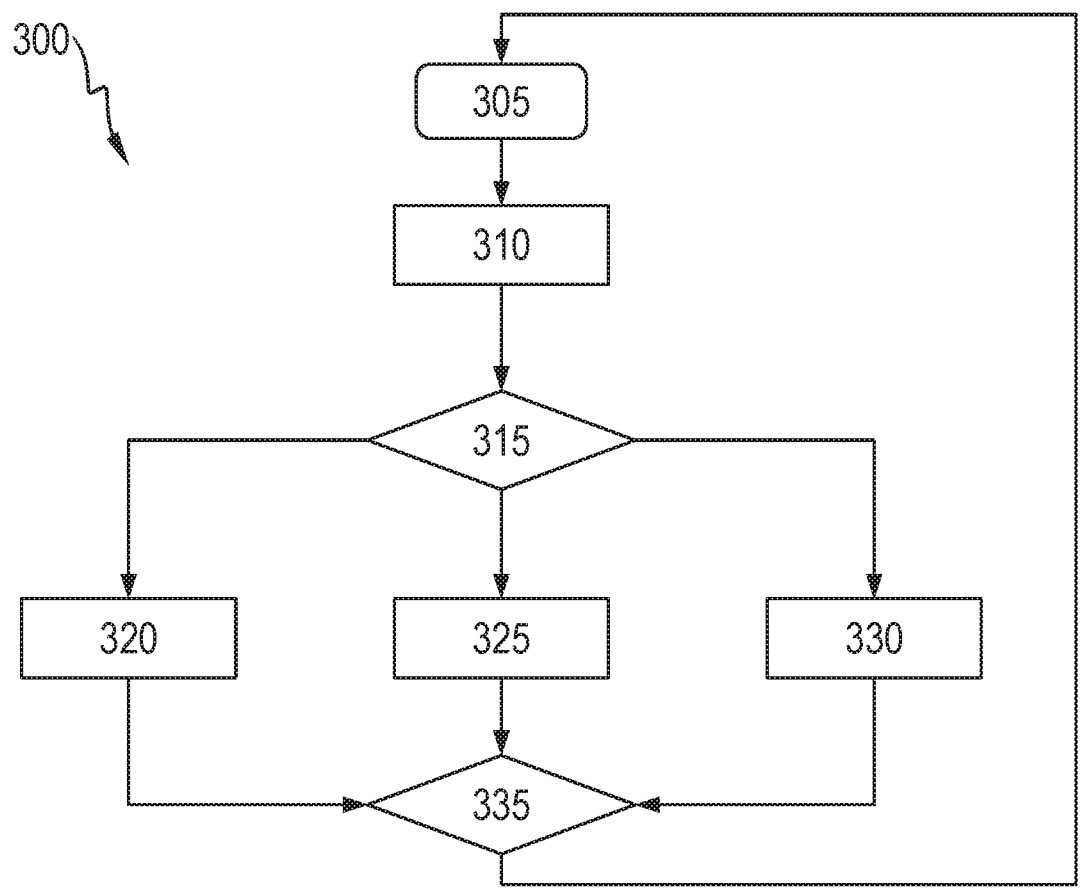
FIG. 3 is a flow diagram of another method.

FIG. 3 shows a flow diagram of another method 300 for controlling the dishwasher 105 of FIG. 1. The method 300 can be considered as an example of a refinement of the method 200.

In a step 305, a cleaning cycle is performed in which parameters and options are used according to previously saved settings or an input by the user. In a step 310, the cleaning cycle is finished. In a step 315, the user can assess the cleaning cycle. This can be done by the user expressing his general satisfaction with the cleaning cycle, or the user can be asked interactively questions of various levels of specificity regarding his satisfaction with one or more sub-aspects of the cleaning cycle, which the user can then answer.

In the embodiment shown, parameters can be optimized with regard to three different sub-aspects. In a step 320, the sub-aspect of cleaning can be performed according to a method 400, in a step 325, the sub-aspect of drying can be performed by a method 500, and in a step 330, the aspect of rinsing to a shine can be performed by a method 600. Alternative or additional sub-aspects are also possible. Usually only one sub-aspect at a time is optimized in order to be able to obtain assessments by the user that are as informative as possible. The methods 400 to 600 are described in greater detail below with reference to FIGS. 4 to 6. Each of these figures involves an exemplary embodiment for optimizing parameters with regard to the relevant sub-aspect.

Figure 4:
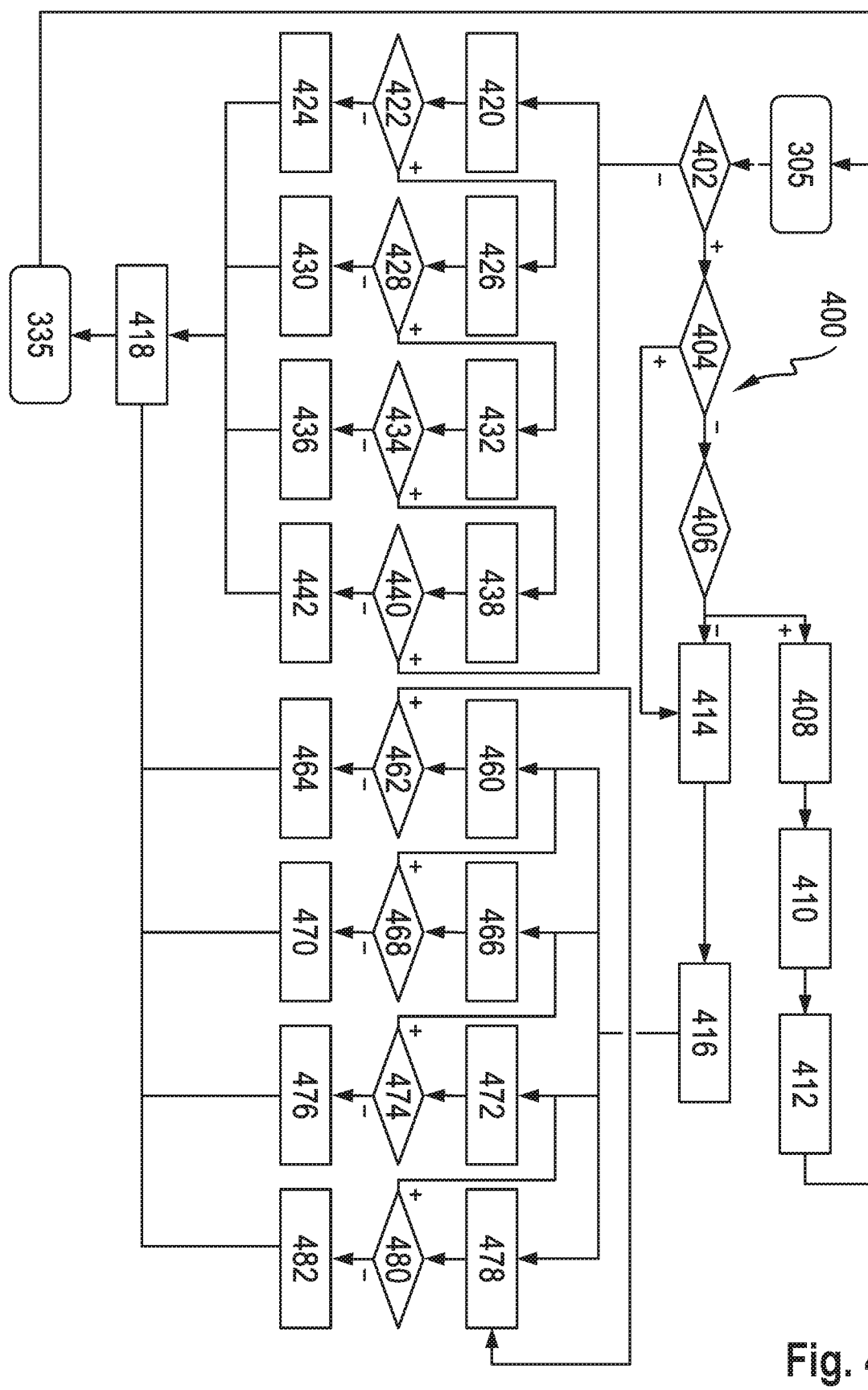
FIG. 4 is a flow diagram of a first part of the method of FIG. 3.

FIG. 4 shows a flow diagram of a method 400 as a possible specific embodiment of the step 320 of the method 300 of FIG. 3. One or more parameters relating to the sub-aspect of cleaning the dishware are optimized here purely by way of example.

In a step 402 it is ascertained whether a user was satisfied with the present sub-aspect for the previous cleaning cycle. This can be done by asking the user one or more questions. If the user is satisfied, then in a step 404, a check can be performed to determine whether no further changes have been made to the parameters underlying the present sub-aspect over longer than a predetermined time. If the parameters were changed only recently, then in a step 406, a check is performed to determine whether the same parameter was changed twice. If this is the case, then in order to avoid control oscillation, the currently valid parameters can be retained in a step 408, and saved in a step 410. In a step 412, the method can then skip to optimizing another sub-aspect. Thus, in the present example, it can be ensured that in the method 300 of FIG. 3, the step 325 or the step 330 follows the step 315.

If it was determined in step 404 that the parameters have not been changed for a prolonged time, or in step 406 that the same parameter has not been changed twice, then in step 414, the method preferably skips to reducing a parameter.

It is assumed here that for influencing the quality of the cleaning, four parameters are available, for example, namely a cycle time, a mechanical parameter, a detergent supply and a temperature. The cycle time denotes the time period over which the dishware undergoes treatment in the cleaning chamber 140; the mechanical parameter denotes, for example, a water pressure or an amount of water; the detergent supply denotes the amount of added detergent, and the temperature denotes a water temperature during cleaning. It is also assumed that a cost of increasing the respective parameters increases in the order in which they were named. The order chosen here should be considered purely as an example of an assumed cost function or cost figure.

The structure of the method 400 provides that first, in steps 420 to 442, one or more of the stated parameters are increased incrementally until the satisfaction of the user can be achieved. An attempt is then made in steps 460 to 482 to reduce the parameters again without losing the satisfaction of the user. The parameters are increased in the order of the associated cost figures, and therefore first the cycle time is extended; if this is not sufficient, a cleaning parameter is increased; if this is not sufficient, a detergent supply is increased; and if this also is not sufficient, the temperature is increased. In reverse, when reducing parameters in steps 460 to 481, it is determined first in a step 416, which of the parameters was changed last, in order to reduce this parameter first and hence to achieve as large a cost saving as possible. If the parameter cannot be reduced without loss of satisfaction of the user, then the parameter of next-lower cost is reduced. This procedure is referred to as escalation in steps 420 to 442, and as de-escalation in steps 460 to 482. After a parameter is changed, information is preferably output to the user, in a step 418, in order to notify the user of the change to the parameter and with the aim of having a better understanding. This ends the method 400, and preferably a jump is made back into the method 300.

After optionally adopting the changed parameters in step 335, the method 300 can return to step 305, cycle through again and, if applicable, recall the method 400.

Figure 5:
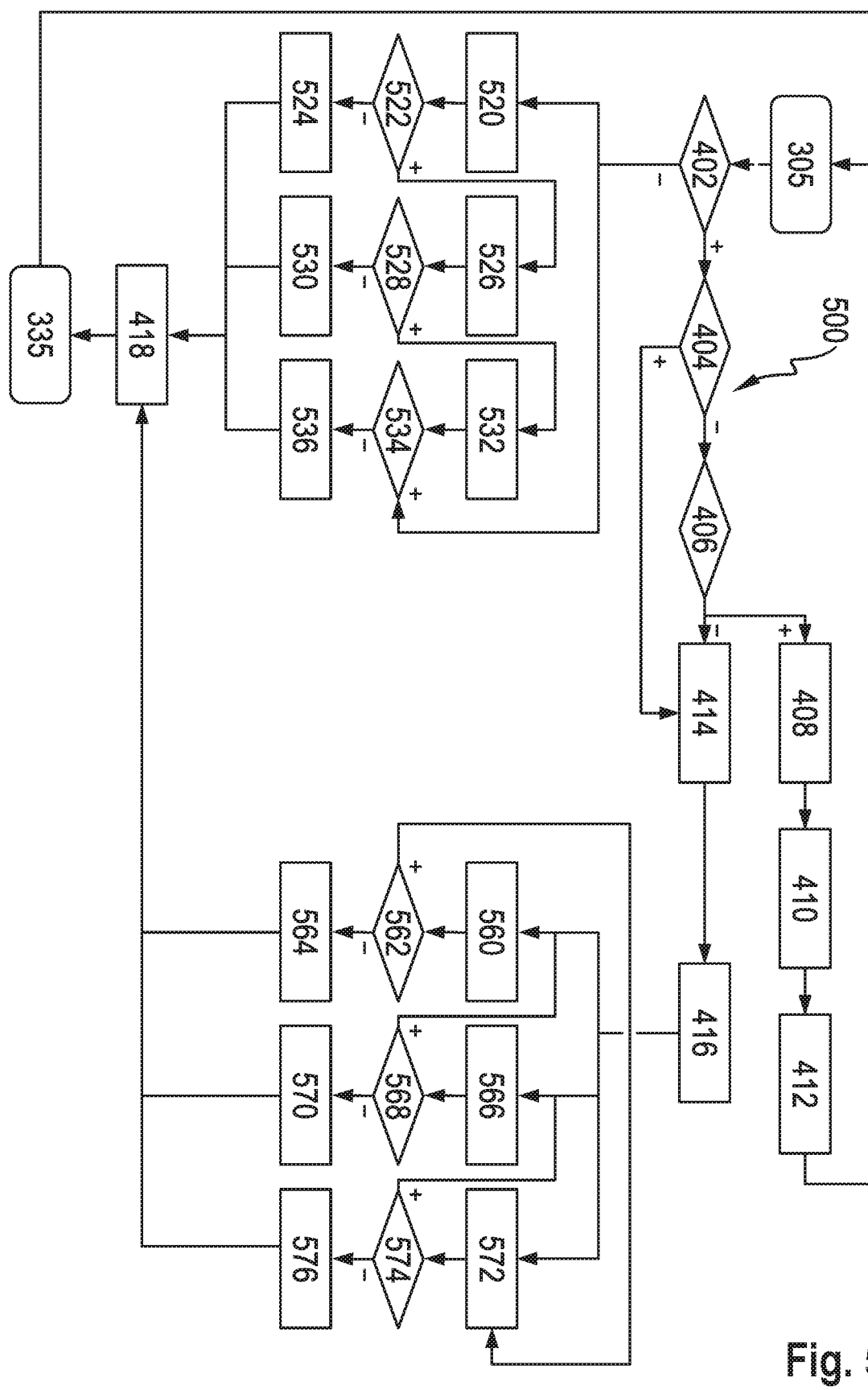
FIG. 5 is a flow diagram of a second part of the method of FIG. 3.

FIG. 5 shows a flow diagram of a method 500 for optimizing parameters with regard to the sub-aspect of drying dishware as part of a cleaning cycle of the dishwasher 105 of FIG. 1. The method 500 is a possible specific embodiment of the step 325 of the method 300 of FIG. 3.

The structure of the method 500 corresponds to that of the method 400, but with the escalation taking place in steps 520 to 536, and the de-escalation in steps 560 to 576. It is assumed here that parameters relating to the present sub-aspect, in ascending order of their costs, relate to a cycle time, a rinse-aid supply and a temperature. The cycle time defines for how long the dishware is dried, the rinse-aid supply defines how much rinse aid is dispensed into the cleaning chamber 140 before or during drying, and the temperature relates to the air temperature during the drying phase.

Figure 6:
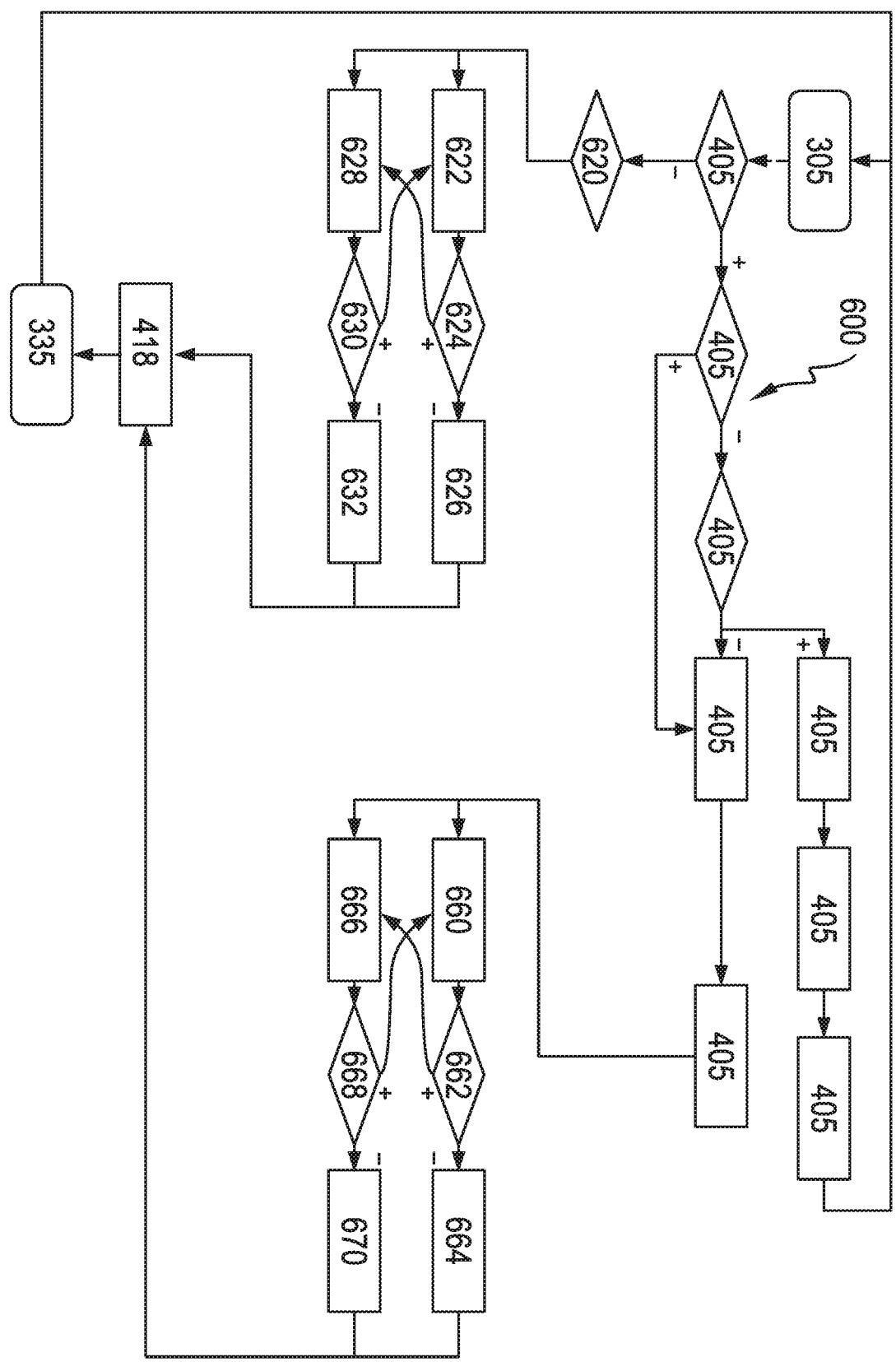
FIG. 6 is a flow diagram of a third part of the method of FIG. 3.

FIG. 6 shows a flow diagram of a method 600 for optimizing a shine on cleaned dishware, in particular on glasses or cutlery. The method 600 is given as a possible specific embodiment of the step 330 of the method 300 of FIG. 3, and its structure corresponds substantially to the structure of the methods 400 and 500. The escalation is performed here in steps 622 to 632, and the de-escalation in steps 660 to 670. Purely by way of example, no escalation takes place here, but a parameter is increased in steps 620 to 632, and reduced in steps 660 to 670. In the event that the user is not satisfied, it is first ascertained, in the step 620, whether stains or smears have appeared on the dishware. In the event of smears, the method continues with the step 622; in the event of stains, the method continues with the step 628. In general, increasing a rinse-aid supply is meant to counteract smears, whereas adjusting a water-hardness setting is meant to reduce stains. The rinse-aid supply and the water-hardness setting may be mutually dependent, and therefore changing the one parameter may make a change to the other parameter necessary.

For optimizing parameters with regard to different sub-aspects in the methods 400 to 600, the same parameters can achieve different effects. For example, the rinse-aid supply is optimized both for drying and for achieving a shine. It is therefore preferred that after optimizing parameters in favor of one sub-aspect, optimization with regard to another sub-aspect is repeated in order to prevent an unwanted side-effect causing the other sub-aspect to deteriorate.

The explanations given with reference to the figures are purely illustrative and shall not be considered as limiting.

LIST OF REFERENCES 100 system
105 dishwasher
110 data network
115 mobile device
120 server
125 processing device
130 memory
140 cleaning chamber
145 sequence controller
150 apparatus
155 processing device
160 first interface
165 second interface
170 input device
175 wireless interface
200 method
205 input
210 assistance
215 feedback
300 method
305 dishwasher active
310 cleaning cycle finished
315 user input: assessment of the cleaning cycle
320 continue with method 400
325 continue with method 500
330 continue with method 600
335 adopt parameters
400 method
402 user satisfied with sub-aspect?
404 parameters not changed for prolonged period?
406 same parameter changed twice?
408 parameters stay the same
410 save parameters
412 optimize next sub-aspect
414 reduce parameters
416 reduce last parameter increased
418 output: information to user
420 parameter: cycle time
422 cycle time has already been increased?
424 increase cycle time
426 parameter: mechanical
428 mechanical parameter has already been increased?
430 increase mechanical parameter
432 parameter: detergent supply
434 detergent supply has already been increased?
436 increase detergent supply
438 parameter: temperature
440 temperature has already been increased?
442 increase temperature
460 parameter: cycle time
462 cycle time has already been reduced?
464 reduce cycle time
466 parameter: mechanical
468 mechanical parameter has already been reduced?
470 reduce mechanical parameter
472 parameter: detergent supply
474 detergent supply has already been reduced?
476 reduce detergent supply
478 parameter: temperature
480 temperature has already been reduced?
482 reduce temperature
500 method
520 parameter: cycle time
522 cycle time has already been increased?
524 increase cycle time
526 parameter: rinse-aid supply
528 rinse-aid supply has already been increased?
530 increase rinse-aid supply
532 parameter: temperature
534 temperature has already been increased?
536 increase temperature
560 parameter: cycle time
562 cycle time has already been reduced?
564 reduce cycle time
566 parameter: rinse-aid supply
568 rinse-aid supply has already been reduced?
570 reduce rinse-aid supply
572 parameter: temperature
574 temperature has already been reduced?
576 reduce temperature
600 method
620 stains or smears?

622 smears; parameter: rinse-aid supply
624 rinse-aid supply has already been increased to maximum?
626 increase rinse-aid supply
628 stains; parameter: water hardness
630 water-hardness setting has already been increased to maximum?
632 increase water-hardness setting
660 parameter: rinse-aid supply
662 rinse-aid supply has already been reduced to minimum?
664 reduce rinse-aid supply
666 parameter: water hardness
668 water-hardness setting has already been reduced to minimum?
670 reduce water-hardness setting

The invention claimed is:

1. A method for controlling a dishwasher, comprising:
capturing a user preference of a user for a cleaning cycle of the dishwasher;
reading, over a plurality of cleaning cycles, parameters associated with the cleaning cycle of the dishwasher;
capturing a user input that indicates satisfaction by the user with one of the plurality of cleaning cycles;
optimizing a parameter of the parameters based on based the user input and the user preference; and
controlling the dishwasher based on the optimized parameter.

2. The method of claim 1, further comprising providing the user with advice to adapt the parameter based on the optimizing.

3. The method of claim 1, further comprising:
outputting a prompt to input indication of satisfaction of the user with a predetermined sub-aspect of the cleaning cycle; and
the optimizing of the parameter is based on the user input with regard to the sub-aspect.

4. The method of claim 3, further comprising defining the prompt according to the user preference.

5. The method of claim 3, wherein the prompt is given according to parameters that have already been optimized.

6. The method of claim 3, further comprising successively changing the parameter over the plurality of cleaning cycles until the user input indicates sufficient optimization of the sub-aspect.

7. The method of claim 6, further comprising:
determining at least two parameters that affect the sub-aspect, with each parameter being associated with a cost figure, and
changing one of the at least two parameters that has a higher one of the cost figures only when a change to another one of the at least two parameters is insufficient for optimization.

8. The method of claim 7, wherein the at least two parameters are optimized with minimization of a sum of the cost figures when the user input indicates for a first time that the sub-aspect has been sufficiently optimized.

9. A computer program product, comprising computer-readable program code that, when executed by an execution device or stored on a non-transitory computer-readable data storage medium, causes execution of a method for controlling a dishwasher, the method comprising capturing a user preference of a user for a cleaning cycle of the dishwasher, reading, over a plurality of cleaning cycles, parameters associated with the cleaning cycle of the dishwasher, capturing a user input that indicates satisfaction by the user with one of the plurality of cleaning cycles, optimizing a parameter of the parameters based on the user input and the user preference, and controlling the dishwasher based on the optimized parameter.

10. The computer program product of claim 9, wherein the user is provided with advice to adapt the parameter based on the optimizing.

11. The computer program product of claim 9, wherein a prompt to input an indication of satisfaction of the user with a predetermined sub-aspect of the cleaning cycle is output, and wherein the parameter is optimized based on the user input with regard to the sub-aspect.

12. The computer program product of claim 11, wherein the prompt is defined according to the user preference.

13. The computer program product of claim 11, wherein the prompt is given according to parameters that have already been optimized.

14. The computer program product of claim 11, wherein the parameter is changed successively over the plurality of cleaning cycles until the user input indicates sufficient optimization of the sub-aspect.

15. The computer program product of claim 14, wherein at least two parameters that affect the sub-aspect are determined, with each parameter being associated with a cost figure, and wherein one of the at least two parameters that has a higher one of the cost figures is changed only when a change to another one of the at least two parameters is insufficient for optimization.

16. The computer program product of claim 7, wherein the at least two parameters are optimized with minimization of a sum of the cost figures when the user input indicates for a first time that the sub-aspect has been sufficiently optimized.

17. Apparatus for controlling a dishwasher, comprising:
a first input device configured to capture a user preference of a user for a cleaning cycle of the dishwasher;
an interface configured to read, over a plurality of cleaning cycles, parameters associated with the cleaning cycle of the dishwasher;
a second input device configured to capture a user input that indicates satisfaction by the user with one of the plurality of cleaning cycles;
a processing device configured to optimize a parameter of the parameters based on the user input and the user preference; and
controlling the dishwasher based on the optimized parameter.

* * * * *